(12) United States Patent
Seipel

(10) Patent No.: US 11,773,900 B2
(45) Date of Patent: Oct. 3, 2023

(54) BEARING ARRANGEMENT

(71) Applicant: Henniges Automotive GmbH & Co. KG, Rehburg-Loccum (DE)

(72) Inventor: Petrie Seipel, Wunstorf (DE)

(73) Assignee: BAYRAK TECHNIK GMBH, Rehburg-Loccum (DE)

( * ) Notice: Subject to any disclaimer, the term of this patent is extended or adjusted under 35 U.S.C. 154(b) by 424 days.

(21) Appl. No.: 16/911,890

(22) Filed: Jun. 25, 2020

(65) Prior Publication Data
US 2020/0408253 A1    Dec. 31, 2020

(30) Foreign Application Priority Data

Jun. 26, 2019  (DE) .......................... 102019117267.5
Apr. 2, 2020   (EP) ..................................... 20167670

(51) Int. Cl.
*F16C 19/54*   (2006.01)
*F16F 1/38*    (2006.01)
*F16F 1/387*   (2006.01)

(52) U.S. Cl.
CPC .............. *F16C 19/54* (2013.01); *F16F 1/387* (2013.01); *F16F 1/3863* (2013.01)

(58) Field of Classification Search
CPC .. F16C 19/54; F16C 2226/52; F16C 2226/76; F16C 27/066; F16C 19/06; F16C 2226/74; F16C 2326/06; F16C 27/04; F16C 2326/01; F16F 1/3863; F16F 1/387; B60K 17/24
See application file for complete search history.

(56) References Cited

U.S. PATENT DOCUMENTS

| | | | |
|---|---|---|---|
| 5,113,988 A | 5/1992 | Caron | |
| 9,328,772 B2 | 5/2016 | Ikeda | |
| 10,941,808 B2 | 3/2021 | Durre et al. | |
| 2002/0037124 A1 | 3/2002 | Bade et al. | |
| 2002/0172442 A1 | 11/2002 | Bade et al. | |
| 2017/0253117 A1 | 9/2017 | Oomiya et al. | |
| 2018/0334030 A1* | 11/2018 | Seipel | F16F 1/3842 |

FOREIGN PATENT DOCUMENTS

| | | |
|---|---|---|
| CN | 102996634 A | 3/2013 |
| CN | 204249819 U | 4/2015 |
| CN | 107152454 A | 9/2017 |

(Continued)

OTHER PUBLICATIONS

English language abstract for EP 1 489 326 A2 extracted from espacenet.com database on Aug. 4, 2021, 1 page.

(Continued)

*Primary Examiner* — Kimberly T Wood
(74) *Attorney, Agent, or Firm* — Howard & Howard Attorneys PLLC

(57) ABSTRACT

A bearing arrangement to be mounted in a bearing support, with at least one rotary bearing and at least one elastomer sleeve accommodating the rotary bearing is described. The elastomer sleeve has at least one frictional contact surface configured to be accommodated in the bearing support and at least one stop collar. The stop collar (7) has recesses (8), and spring clips (9) arranged in the recesses (8), with which the elastomer sleeve (4) is secured to the bearing support (1).

6 Claims, 3 Drawing Sheets

(56) References Cited

FOREIGN PATENT DOCUMENTS

| DE | 3911793 C2 * | 7/1999 | ............. F16D 23/12 |
|---|---|---|---|
| DE | 102012021678 A1 | 5/2014 | |
| DE | 102014107477 A1 | 12/2015 | |
| EP | 0462870 A1 | 12/1991 | |
| EP | 1489326 A2 | 12/2004 | |
| JP | H 10-16585 A | 1/1998 | |
| JP | H1016585 A | 1/1998 | |
| JP | 2000192954 A | 7/2000 | |
| JP | 2013099995 A | 5/2013 | |
| WO | 2018234047 A1 | 12/2018 | |

OTHER PUBLICATIONS

Chinese Search Report for Application CN 2020105811588 dated Sep. 23, 2021, 3 pages.
English language abstract for CN 102996634 A extracted from espacenet.com database on Oct. 11, 2021, 2 pages.
English language abstract for CN 204249819 U extracted from espacenet.com database on Oct. 11, 2021, 1 page.
English language abstract for CN 107152454 A extracted from espacenet.com database on Oct. 11, 2021, 2 pages.
English language abstract for DE 10 2012 021678 A1 extracted from espacenet.com database on Oct. 11, 2021, 1 page.
English language abstract for WO 2018/234047 A1 extracted from espacenet.com database on Oct. 11, 2021, 2 pages.
English language abstract for JPH 10-16585 A extracted from Japanese Patento Office database on Jun. 18, 2022, 4 pages.
Chinese Search Report for Application CN 202010581158.8 dated May 23, 2022, 2 pages.
Machine-assisted English language abstract for DE 10 2014 107 477 A1 extracted from espacenet.com database on Sep. 24, 2020, 2 pages.
English language abstract for EP 0 462 870 A1 extracted from espacenet.com database on Sep. 24, 2020, 1 page.
English language abstract for JP 2000-192954 A extracted from espacenet.com database on Sep. 24, 2020, 1 page.
English language abstract for JP 2013-099995 A extracted from espacenet.com database on Sep. 24, 2020, 1 page.
European Search Report for Application EP 20 16 7670 dated Sep. 10, 2020, 2 pages.

* cited by examiner

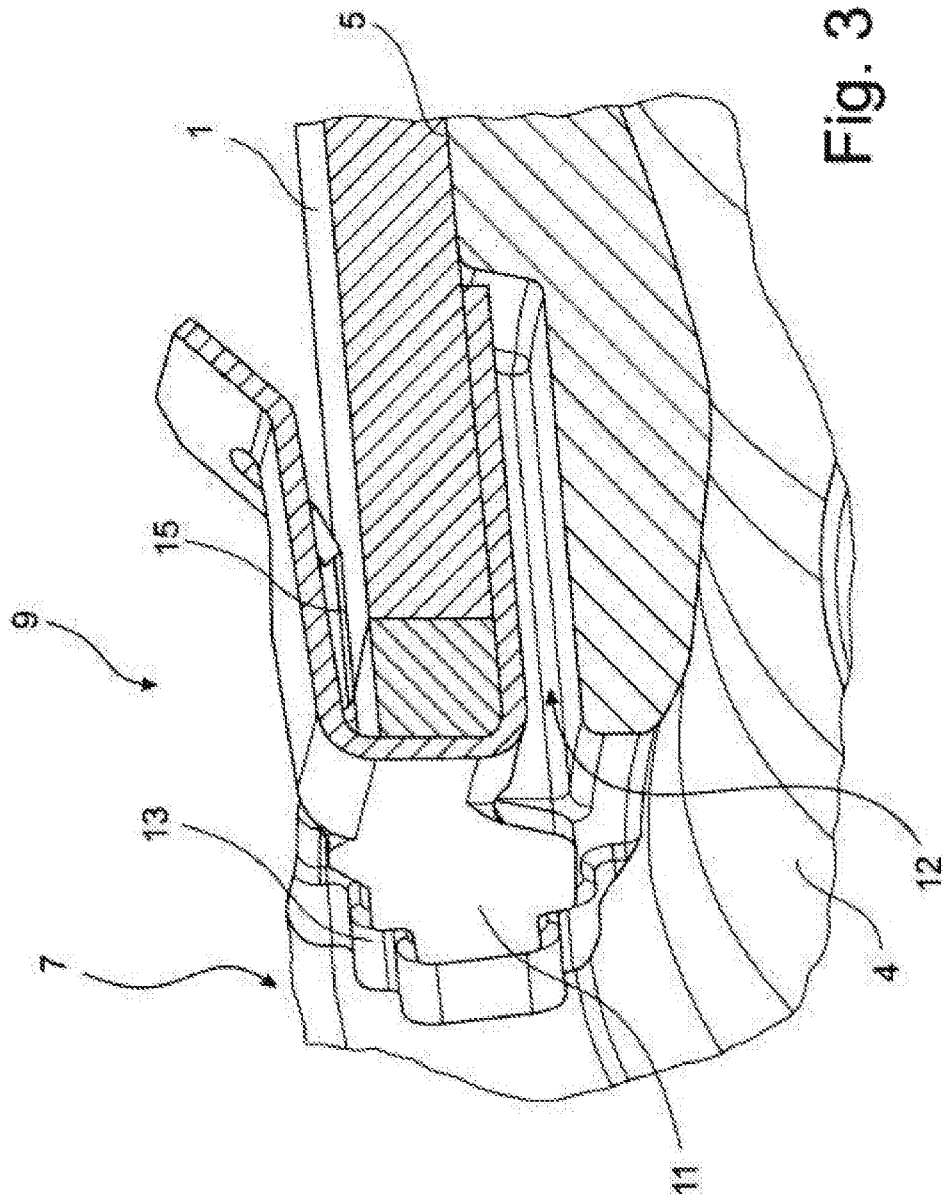

BEARING ARRANGEMENT

CROSS-REFERENCE TO RELATED APPLICATIONS

The subject application claims priority to German Patent Application No. 102019117267.5, filed on Jun. 26, 2019, and European Application No. 20167670.7, filed on Apr. 2, 2020, the contents of which are incorporated herein by reference in their entirety.

FIELD OF THE INVENTION

The invention relates to a bearing arrangement to be mounted in a bearing support with at least one rotary bearing and at least one elastomer sleeve receiving the rotary bearing, the elastomer sleeve having at least one frictional contact surface configured to be received in the bearing support.

BACKGROUND OF THE INVENTION

Bearing arrangements of this kind are cardan shaft center bearings or cardan shaft intermediate bearings used in motor vehicle construction for vibration damping, the elastomer sleeves act as vibration dampers for the drive shafts. The bearing arrangement itself consists at least of the rotary bearing and the elastomer sleeve at least partially surrounding the rotary bearing. The so-called insert technology is known for the operationally reliable mounting of the elastomer sleeve into a bearing support, wherein the elastomer sleeve and the rotary bearing which is at least partially surrounded by the elastomer sleeve are named insert. With the insert technology, the elastomer sleeve is arranged in the bearing support by pressing, forming, joining or overmoulding of clamping or connection rings. The bearing support carries the insert and is used to mount the insert to a vehicle. It can also be said that the insert is arranged in an opening of the bearing support, whereby only the elastomer sleeve and the bearing support are in direct contact, but not the rotary bearing and the bearing support, in order not to transmit oscillations and vibrations of the shaft passing through the rotary bearing onto the bearing support and ultimately onto the vehicle. This means that the elastomer sleeve has direct contact with the inside of the bearing support, i.e. the side of the bearing support facing the rotary bearing, and the rotary bearing has indirect contact with the inside of the bearing support via the elastomer sleeve. Overall, the production of such bearing supports with corresponding bearing arrangements is complex, since pressing requires maintaining of low tolerances, forming requires the use of expensive flanging tools, joining requires the use of additional locking elements and overmoulding requires the use of expensive injection moulding tools.

An example of a bearing arrangement with bearing support is described in the German Patent application DE 10 2017 110 874 A1. This document describes a bearing arrangement in which the elastomer sleeve has an elastomeric fold, over the course of which the sleeve material has a weakening of rigidity. An axial force introduced into this bearing arrangement then causes the weakened material to move out of the elastomeric fold and a new area of higher rigidity entering the elastomeric fold leads to an increase in the normal forces acting on the frictional contact surface and thus to a strengthening of a frictional connection between the elastomer sleeve and the bearing support.

However, adverse circumstances, such as contamination of the frictionally engaged surfaces, i.e. the surface of the elastomer sleeve facing the bearing support and the surface of the bearing support facing the elastomer sleeve, with lubricants, can cause the known bearing arrangements to lose their self-locking effect and the rotary bearing together with its elastomer sleeve to move out of the bearing support.

SUMMARY OF THE INVENTION

The task of the present invention is therefore to disclose a bearing arrangement of a known type, in which the risk that the rotary bearing together with the elastomer sleeve moving out of the bearing support is significantly reduced in a particularly simple manner.

According to the invention, this task is solved by a bearing arrangement with the features of claim 1. Advantageous improvements of the invention are indicated in the dependent claims.

The bearing arrangement in accordance with the invention comprises a rotary bearing and an elastomer sleeve at least partially surrounding the rotary bearing. The bearing arrangement according to the invention is characterized in that the elastomer sleeve comprises at least one stop collar which is designed in such a way that it comes into direct contact with the bearing support during assembly on a corresponding bearing support. It can also be said that the stop collar comes to rest on an edge of the bearing support. The bearing support has two edges, which are given by an axial opening in the bearing support, wherein the bearing arrangement according to the invention is accommodated in the respective opening. The stop collar comprises recesses. The recesses are configured in such a way that spring clips can be arranged at least partially in them to secure the elastomer sleeve to the bearing support. The stop collar is an axial stop formed on the elastomer sleeve for one-sided limitation of axial movement of the rotary bearing within the bearing support. The stop collar has an outer geometry that prevents slipping through the opening of the bearing support in at least one direction. For example, the elastomer sleeve as well as the opening in the bearing support can have a circle like geometry. In this case, the stop collar of the elastomer sleeve can have an outer diameter that is larger than the inner diameter of the opening in the bearing support. This prevents movement of the elastomer sleeve through the bearing support in the direction opposing the stop collar. The spring clips form a second axial stop which act in an opposite direction to the axial stop formed with the stop collar. As a result, the bearing arrangement consisting of the rotary bearing and the elastomer sleeve is fixed between these two axial stops with regard to its axial freedom of movement. The recesses for the spring clips are access openings of partially maximal low size, through which the spring clips can be fixed to the bearing support. The spring clips claw or jam on both sides or at least on one side of the bearing support. The claw or clamping effect is generated between the inner part of the spring clips and the outer part of the spring clips. The inner part of the spring clips can be in direct or indirect contact with the inner surface of the bearing support, i.e. the surface of the bearing support facing the rotary bearing. In the case of indirect contact, a thin layer of the elastomer sleeve may still be present between the inner part of the spring clips and the bearing support. In this case the recess is completely formed in the elastomer sleeve. It can also be said that the recess is surrounded by the material of the elastomer sleeve on all but one side. The one free side of the recess is the one in which the inner part of the spring clips engages or penetrates. In direct contact, the inner part of the spring clips is in direct contact with the inner surface of the bearing support. In this case there is no elastomer sleeve material between the inner part of the spring clips and the inner surface of the bearing support. In this case, it can also be said that the recess in the elastomer sleeve has at least two sides that are not surrounded by the elastomer sleeve material. One side is the one in which the inner part of the spring clips engages or penetrates and the other side is the one facing the inner surface of the bearing support. In the case of direct contact, it can also be said that the inner part of the spring clips contacts the inside of the opening in the bearing support.

The outer part of the spring clips is in direct contact with the outer surface of the bearing support, i.e. the surface of the bearing support facing away from the rotary bearing. It can also be said that the spring clip at least partially embraces the bearing support, thereby fixing the stop collar of the elastomer sleeve to the edge of the opening of the bearing support. At least a part of the spring clip can be brought into engagement or form-fit with the stop collar of the elastomer sleeve to fix it onto the edge of the opening of the bearing support.

According to a further development of the invention, the spring clips have clamping surfaces converging into cutting edges. These can, for example, be arranged on the outer portion of the spring clips to claw into the bearing support in order to increase friction. Depending on the design of the elastomer sleeve, cutting edges can also be arranged on the inner portion of the spring clips. In this case, it is preferable to leave a gap between the inner portions of the spring clips and the elastomer sleeve so that the latter is not damaged. The spring clips can be made out of metal, or at least of a material that is harder than the bearing support. Clamping forces acting on the legs of the spring clips thus lead to surface damage of the bearing support and thus to clawing of the cutting edges into the bearing support. In other words, the cutting edges cut into the material of the bearing support and prevent the spring clips from moving in an axial direction. This direction is opposite to the axial direction against which the stop collar prevents movement. By this clawing, a safeguard against unintentional loosening of the bearing arrangement from the bearing support is given. However, it is also possible that the spring clips are made out of plastic.

According to a further development of the invention, the spring clips have clip heads that interact in a from-fit manner with the recesses. These clip heads form the actual stop structure, which secure the elastomer sleeve against unintentional slipping out of the bearing support. The present invention allows some leeway in the design of the clip heads. The clip heads must only be designed in such a way that they can be brought into contact with or into a form-fit with the stop collar of the elastomer sleeve in order to hold the elastomer sleeve onto the edge of the bearing support.

According to a preferred further development of the invention, the recesses of the elastomer sleeve have openings with a countersink for receiving the clip heads in a flushed or recessed manner. This means that the clip heads are received by the stop collar of the elastomer sleeve in such a way that the clip heads do not extend beyond the stop collar. It can also be said that the stop collar at least partially accommodates the clip heads. For this purpose, the recesses of the stop collar may have countersinks which are essentially complementary to the clip heads in shape and design. This not only ensures a form-fit connection between the stop collar and the clip heads, but also that these do not extend beyond the stop collar and are therefore flush with the surface or recessed with the stop collar. Within the scope of the invention, the countersinks may also be designed as notches, which open towards the collar edge of the stop collar.

The bearing arrangement in accordance with the invention ensures adequate fastening of the elastomer sleeve and thus of the rotary bearing in the bearing support when the elastomer sleeve is secured to the bearing support by means of at least three rotationally symmetrically arranged spring clips. However, special loads and dimensioning of the bearing arrangement may require the use of more than three rotationally symmetrically arranged spring clips.

In order to be able to manufacture the bearing arrangement according to the invention in a particularly simple way, the spring clips are bent parts made from spring steel sheet. Such bent parts can be produced in large quantities at particularly low cost. However, the invention is not limited to spring clips made of spring steel sheet. Of course, other metals, alloys or even fiber composites can also be suitable alternatives.

According to a particularly advantageous further development of the invention, the elastomer sleeve has at least one elastomeric fold, over the course of which the sleeve material has at least one weakening of rigidity. An axial force introduced into the bearing support via the rotary bearing then causes the weakened material to migrate out of the elastomeric fold, and a new area of higher rigidity entering the elastomeric fold leads to an increase in the normal forces acting upon the frictional contact surface and thus lead to a strengthening of the frictional connection established between the elastomer sleeve and the bearing support. With the reinforcement of the frictional connection, the bearing arrangement according to the invention exhibits a kind of self-locking effect with which the securing produced by the spring clips is relieved.

BRIEF DESCRIPTION OF THE FIGURES

An embodiment example of the invention, from which further inventive features result, is shown in the drawings.

FIG. 3: shows an enlarged detailed view of the arrangement according to the invention as shown in FIG. 2.

The terminology used herein is for the purpose of the embodiment example only and is not intended to be restrictive. As used herein, the singular forms of "one" and "the" may also include the plural forms unless the context clearly indicates otherwise.

Spatially relative terms such as "inside", "outside", "below", "under", "lower", "above", "over" and the like may be used herein for descriptive purposes only and to describe the relationship of an element or feature to another element or feature as shown in the figures. Spatially relative terms may include different orientations of the inventive arrangement in addition to the orientation shown in the figures.

Figure 1:
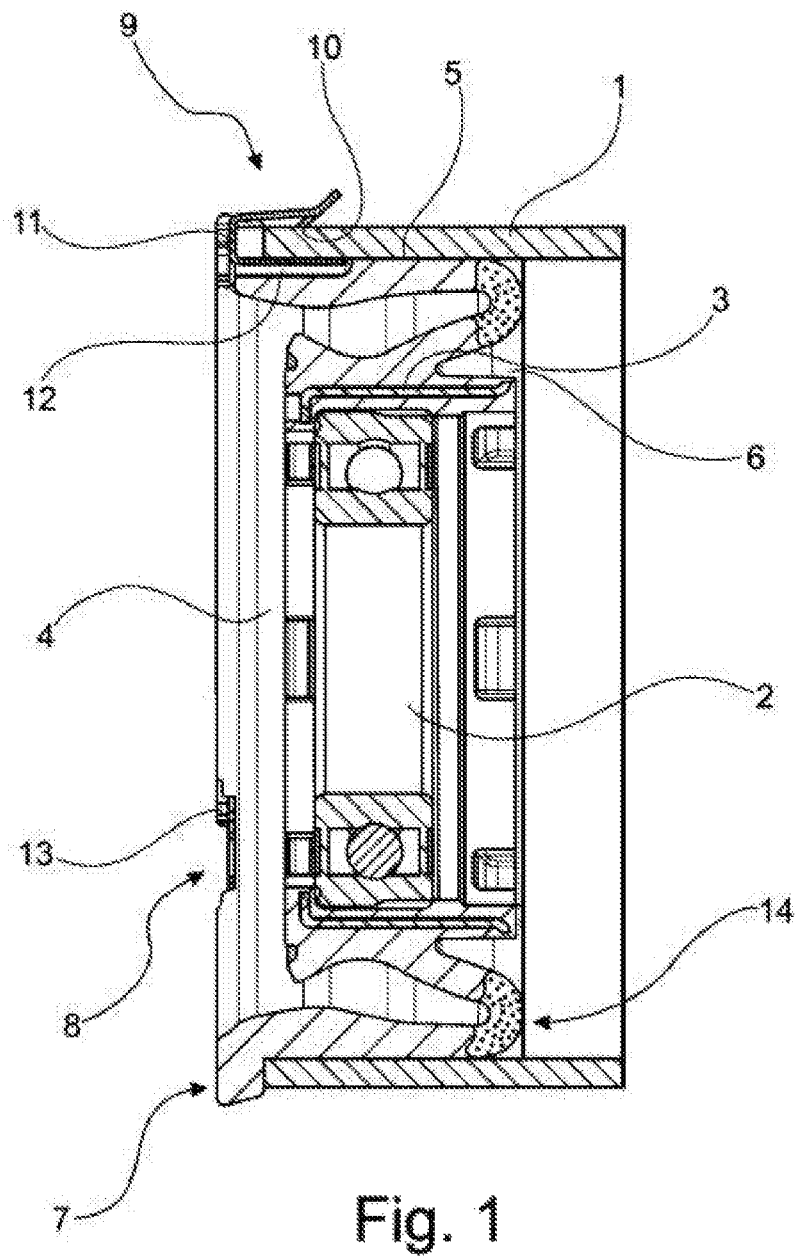
FIG. 1: shows a center cut view of a bearing arrangement according to the invention, arranged in the bearing support.

FIG. 1 shows a bearing arrangement according to the invention mounted into a bearing support 1. The bearing arrangement comprises a rotary bearing 2, a bearing cage 3 accommodating the rotary bearing 2 and an elastomer sleeve 4 accommodating the rotary bearing 2 together with the bearing cage 3. The elastomer sleeve 4 has a frictional contact surface 5 designed to be accommodated in the bearing support 1 and an elastomeric fold 6. In the embodiment example shown here, the elastomer sleeve 4 has a stop collar 7 with three recesses 8 distributed rotationally symmetrically on the stop collar 7. Spring clips 9 are arranged in the recesses 8, with which the elastomer sleeve 4 is secured to the bearing support 1. The spring clips 9 have clamping surfaces converging into cutting edges 10 as well as clip heads 11 which interact in a form-fit manner with the recesses 8 of the elastomer sleeve 4. In the embodiment example shown here, the spring clips 9 are U-shaped and embrace the edge of the bearing support 1, i.e. the edge defined by the opening in the bearing support 1. Thus, the inner portion of the spring clips 9 contact the inner portion of the bearing support 1, i.e. the part facing the rotary bearing 2. The outer part of the spring clips 9 contact the outer portion of the bearing support 1, which is facing away from the rotary bearing 2. The recesses 8 of the elastomer sleeve 4 have apertures 12 with countersinks 13 for flush mounting of the clip heads 11. In the embodiment example shown here, the apertures 12 of the recesses 8 of the elastomer sleeve 4 are designed in such a way that they allow at least part of the spring clips 9 to be inserted through the elastomer sleeve 4 so that the inserted portion of the spring clips 9 can directly contact the inside of the bearing support 1. In the embodiment example shown here, the aperture 12 is designed such that when the inserted portion of the spring clips 9 touches the inside of the bearing support 1, the elastomer sleeve 4 does not touch the spring clips 9. It can therefore be said that there is a gap between the spring clips 9 and the elastomer sleeve 4 in the area of the apertures 12 in the embodiment example shown here. In the embodiment example shown here, the recesses 8 therefore have two open sides, one side is designed as an aperture 12 for the inner portion of the spring clips 9 to be inserted and the other side is open to the inside of the bearing support 1, so that the inner portion of the spring clips 9 can directly contact the bearing support 1.

DETAILED DESCRIPTION OF THE INVENTION

The elastomer sleeve 4 has a single elastomeric fold 6, over the course of which the sleeve material has a weakening of rigidity 14, which is represented in the figure by a dotted area.

Figure 2:
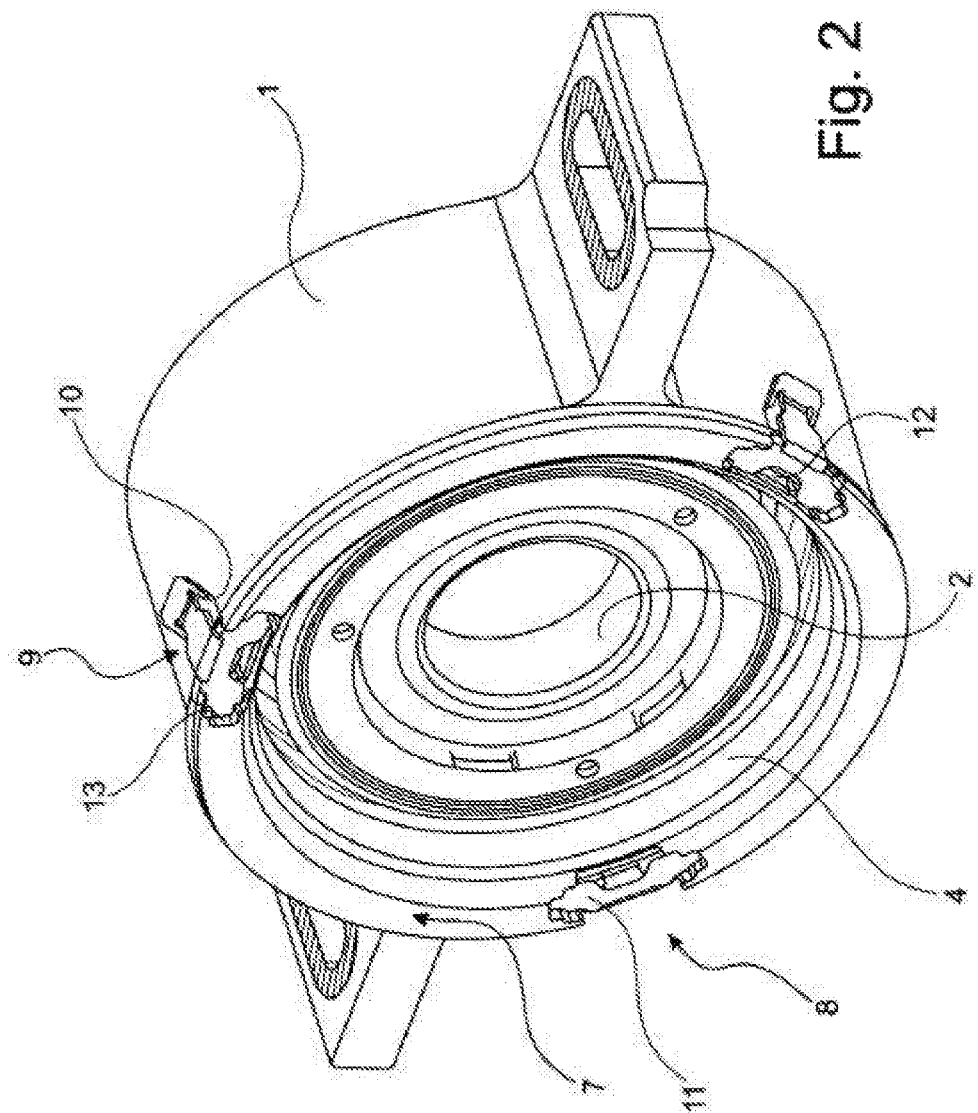
FIG. 2: shows a perspective view of the bearing arrangement according to the invention as shown in FIG. 1.

FIG. 2 shows a perspective view of the bearing arrangement according to FIG. 1. Identical components are provided with identical reference numbers. In the embodiment example shown here, the clip heads 11 of the spring clips 9 are recessed with the stop collar 7. The clip heads 11 therefore do not extend beyond the stop collar 7, so that a further component can be arranged directly onto the stop collar 7. For this purpose, the countersinks 13 of the recesses 8 and their extension in the stop collar 7 are designed to complement the clip heads 11. This additionally causes a form-fit of the clip heads 11 with the stop collar 7, which prevents the elastomer sleeve 4 from twisting. Furthermore, in the embodiment example shown in FIG. 2, the cutting edges 10 of the spring clips 9 can be seen, which claw into the outer surface of the bearing support 1 in order to prevent the elastomer sleeve 4 from being pulled out of the bearing support 1. The spring clips 9 together with the stop collar 7 therefore have the effect of fixing the elastomer sleeve 4 with respect to the two axial directions. In other words, the elastomer sleeve 4 cannot move out of the bearing support 1 in one direction—in the embodiment example shown here the forward direction—nor in the other direction—in the embodiment example shown here the backward direction. Furthermore, the spring clips 9 also ensure that the elastomer sleeve 4 cannot twist in the bearing support 1.

FIG. 3 shows an enlarged detailed view of the bearing arrangement according to FIG. 2. The detail shown concerns the arrangement of one of the spring clips 9 on the bearing support 1, whereby it can be seen that clamping forces acting on the legs of the spring clip 9 have left a scratch-like surface damage 15 when the spring clip 9 is fitted onto the bearing support 1, with which a claw is formed. Identical components are provided with identical reference numbers.

In the embodiment example shown here, the spring clips 9 is U-shaped. The inner leg or portion of the spring clip 9 directly contacts the inner side of the bearing support 1, i.e. the side of the bearing support 1 facing the rotary bearing 2. The outer leg or portion of the spring clip 9 has the cutting edges 10 which engage with the outside of the bearing support 1 to prevent the spring clip 9 from coming loose. Due to the direct contact of the bearing support 1 by the spring clip 9 on the inside of the bearing support 1 as well as on the outside of the bearing support 1, the greatest possible clamping effect is achieved, since the legs of the spring clip 9 can brace themselves against the relatively hard material of the bearing support 1. This results in the greatest possible axial fixing of the elastomer sleeve 4.

In the embodiment example shown here, the clip head 11 is designed to complement the countersink 13 of the recesses 8 in the stop collar 7. The clip head 11 creates a form-fit connection with the countersink 13 and is arranged in this countersink 13 in such a way that the clip head 11 does not protrude beyond the stop collar 7. The person skilled in the art is aware that it is also possible to deviate from the shape of the clip head 11 shown here without impairing its function. In the here shown embodiment example, it can be seen that below the clip head 11 a portion of the stop collar 7 is arranged, namely between the edge of the bearing support 1 and the clip head 11. This means that the countersink 13 does not extend over the entire height of the stop collar 7. It will be recognized that the part of the stop collar 7 which is arranged below the clip head 11 is held between the edge of the bearing support 1 and the clip head 11. The spring clips 9 therefore fix the stop collar 7 onto the edge of the bearing support 1 and thus the elastomer sleeve 4 and the rotary bearing 2 in the bearing support 1 or in the central opening of the bearing support 1, respectively.

All features mentioned in the above description and in the claims can be combined with the features of the independent claim in any possible way. The disclosure of the invention is thus not limited to the described or claimed combinations of features, rather all combinations of features which are useful within the scope of the invention are to be considered as disclosed.

The invention claimed is:

1. A bearing arrangement to be mounted in a bearing support, the bearing support comprising:
   at least one rotary bearing;
   at least one elastomer sleeve receiving the rotary bearing, the elastomer sleeve having at least one frictional contact surface configured to be received in the bearing support, with the elastomer sleeve having at least one stop collar having a plurality of recesses; and
   a spring clip arranged in each recess for securing the elastomer sleeve to the bearing support;
   wherein the spring clips have clamping surfaces converging into cutting edges.

2. The bearing arrangement according to claim 1, wherein the spring clips each have a clip head interacting with the recesses in a form-fit manner.

3. The bearing arrangement according to claim 2, wherein the recesses of the elastomer sleeve have apertures with countersinks that receive the clip heads so that the clip heads are flush with an outer surface of the elastomer sleeve.

4. The bearing arrangement according to claim 1, wherein there are at least three spring clips arranged rotationally symmetrical about the elastomer sleeve.

5. The bearing arrangement according to claim 1, wherein the spring clips are bent parts manufactured from spring steel sheet.

6. The bearing arrangement according to claim 1, wherein the elastomer sleeve has at least one elastomeric fold, with at least one weakening of rigidity.

* * * * *

UNITED STATES PATENT AND TRADEMARK OFFICE
CERTIFICATE OF CORRECTION

PATENT NO. : 11,773,900 B2
APPLICATION NO. : 16/911890
DATED : October 3, 2023
INVENTOR(S) : Petric Seipel It is certified that error appears in the above-identified patent and that said Letters Patent is hereby corrected as shown below:

On the Title Page

Item (72) Inventor: delete "Petrie" and insert therefor --Petric--

Signed and Sealed this
Thirteenth Day of February, 2024

Katherine Kelly Vidal
*Director of the United States Patent and Trademark Office*